United States Patent Office 3,579,413
Patented May 18, 1971

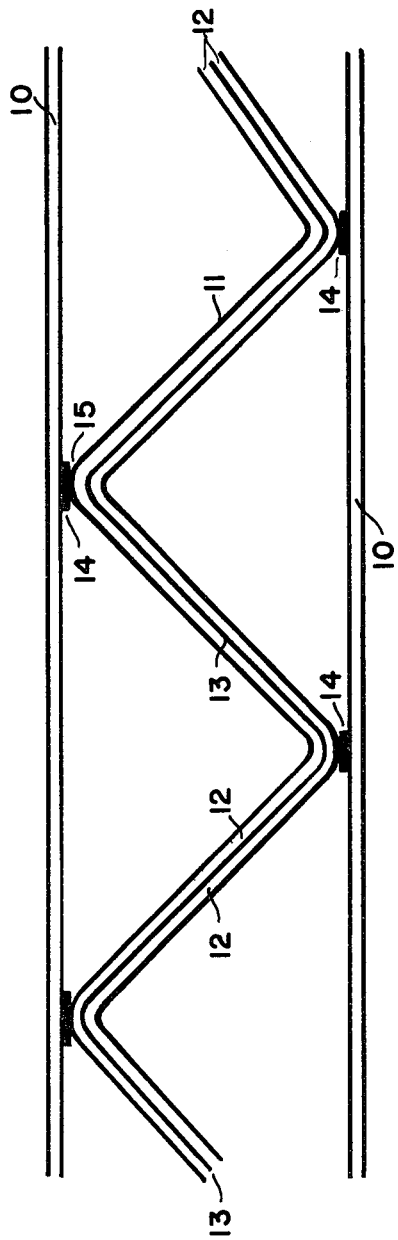
Russell E. Koons
INVENTOR.

3,579,413
CORRUGATED BOARD CONSTRUCTION
Russell E. Koons, St. Louis, Mo., assignor to
Monsanto Company, St. Louis, Mo.
Filed Jan. 3, 1966, Ser. No. 519,813
Int. Cl. B32b *11/06*
U.S. Cl. 161—135                                3 Claims

ABSTRACT OF THE DISCLOSURE

Corrugated board materials having improved properties are made utilizing a corrugated sheet comprising a laminate of at least two corrugated sheets laminated together with an asphalt-wax composition. The composition is comprised of 80 to 97 weight percent asphalt and 3 to 20 weight percent petroleum derived wax. The composition has a softening point of from 170 to 230° F., a penetration at 32° F., 200 grams, 60 seconds of 15 to 30 mm./10, a penetration at 77° F., 100 grams, 5 seconds of 25 to 45 mm./10, a penetration at 115° F., 50 grams, 5 seconds of 40 to 70 mm./10 and a viscosity (Saybolt Furol) at 375° F. of 25 to 250 seconds.

---

The present invention relates to corrugated board constructions. More particularly, the present invention relates to corrugated board constructions and a method for their preparation, which constructions possess substantially improved properties with respect to strength and friability.

Generally, corrugated boards consist of a corrugated sheet, usually a corrugated paper sheet, and at least one substantially flat lining sheet, also usually paper, joined to the crests of the corrugations on at least one side of the corrugated sheet. More often a second substantially flat lining sheet is joined to the crests of the corrugations on the side of the corrugated sheet opposite the first lining sheet. The corrugated sheet is joined to the lining sheet or sheets by means of an adhesive material such as a starch adhesive, applied to the crest of the corrugations of the corrugated sheet. Because of the corrugated sheet in the corrugated board, the corrugated board possesses substantially greater strength than does ordinary paperboard. Corrugated board is used, principally, in the construction of containers and spacing media for containers. Such containers and spacing media are used for the packaging of a vast multitude of materials.

Despite the improved strength of conventional corrugated boards as compared with ordinary paperboard, additional strength in corrugated boards is often necessary. Utilization of corrugated board in containers which must withstand rough handling and treatment or which are to be stacked such as to require withstanding a considerable weight load has resulted in the development of methods to impart additional strength to conventional corrugated boards. These methods have taken the form of merely using heavier and thicker paper in preparing the corrugated board, the use of two corrugated sheets with a flat lining sheet between them and flat lining sheets attached to their exterior flutes, and the like. It has been proposed to strengthen corrugated board by impregnating the paperboard lining sheets with such materials as asphalts. An additional method of strengthening corrugated board consists of laminating two or more sheets of corrugating paper with an asphalt laminating medium, corrugating the resulting laminate and preparing a corrugated board with the asphalt laminated corrugated sheet.

The asphalts commonly used to impart strength to corrugated boards are those of high softening point and low penetration. Such asphalts usually are adequate if strength is the only test. However, when corrugated board containers are used to package such materials as foodstuffs, those commonly used asphalts are not always acceptable. These high softening point and low penetration asphalts are usually quite friable and if the container is punctured, the asphalt shatters in the vicinity of the puncture and the resulting fragments of asphalt fall into the foodstuff rendering it unsightly, at least for food use. The use of softer asphalts would seem to be a logical means of overcoming this deficiency, but softer asphalts reduce the strength of the corrugated board. Thus, a significant problem is created with respect to the use of corrugated board containers in which asphalt is used as a strengthening material, particularly as a laminating medium in the corrugated sheet, the problem being finding an asphaltic material which possesses low friability and yet which will not flow significantly and will impart good strength characteristics to corrugated board in which it is used.

It is an object of the present invention to provide a new and improved corrugated board construction. An additional object of the present invention is to provide a method for preparing a new and improved corrugated board construction. Another object of the present invention is to provide a method for imparting improved strength to corrugated paper boards and a novel corrugated paper board possessing improved strength. It is also an object of the present invention to provide a method for the preparation of a corrugated paper board possessing improved strength. Another object of the present invention is to provide an asphaltic composition particularly useful for laminating paper used in the construction of corrugated board constructions. It is also an object of the present invention to provide an asphaltic composition for use in laminating paper used as the corrugated sheet in corrugated board, said asphalt having low friability and good strength properties. Yet another object of the present invention is to provide a corrugated paper board construction having a corrugated sheet comprising paper laminated with an asphaltic composition of low friability and good strength properties. Another object of the present invention is to provide a method for the preparation of a corrugated paper board construction having a corrugated sheet comprising paper laminated with an asphaltic composition of low friability and good strength properties. Additional objects will become apparent from the following description of the invention herein disclosed.

The invention which fulfills these and other objects is in one embodiment, a corrugated board construction comprising a corrugated sheet having attached to the crests of the corrugations thereof at least one substantially flat outer lining sheet, said corrugated sheet comprising at least two sheets laminated with an asphaltic composition comprised of 80 to 97% by weight of an asphalt and 3 to 20% by weight of a petroleum-derived wax, said asphaltic composition having a softening point of 170 to 230° F., a penetration at 32° F., 200 grams, 60 sec. of 15 to 30 mm./10, a penetration at 77° F., 100 grams, 5 sec. of 25 to 45 mm./10, a penetration at 115° F., 50 grams, 5 sec. of 40 to 70 mm./10 and a viscosity Saybolt Furol at 375° F. of 25 to 250 seconds.

In a preferred embodiment, the corrugated board composition of the present invention is one in which the substantially flat outer lining sheets and the corrugated sheets are a paper, paperboard, or cardboard.

In another embodiment, the present invention is an asphaltic composition useful as a laminating medium in the preparation of laminated sheets for use in corrugated board constructions, said asphaltic composition comprising 80 to 97% by weight of an asphalt and 3 to 20% by weight of a petroleum-derived wax, said asphaltic composition having a softening point of 170 to 230° F., a penetration at 32° F., 200 grams, 60 sec. of 15 to 30 mm./10, a penetration at 77° F., 100 grams, 5 sec. of 25 to 45 mm./10, a penetration at 115° F., 50 grams, 5 sec. of 40 to 70 mm./10 and a viscosity Saybolt Furol at 375° F. of 25 to 250 seconds.

The corrugated board constructions described above are prepared by laminating two or more sheets of material suitable for corrugating with the above-described asphaltic composition, corrugating the resulting laminate and adhering at least one substantially flat outer lining sheet to the corrugations of the corrugated laminate. It is, of course, within the scope of the present invention to first corrugate two sheets suitable for corrugation and then laminate the two sheets with the above-described asphaltic composition.

Corrugated boards of the construction disclosed and described herein possess good strength properties in comparison to ordinary corrugated boards as well as to corrugated boards in which the corrugated sheet contains the more conventional high softening point, low penetration asphalts. Further, and particularly important, the asphaltic compositions used as a laminating medium in the corrugated sheets of the corrugated board constructions of the present invention have low friability and are thus quite useful in the preparation of corrugated board constructions for packaging foods. An additional advantage of the asphaltic compositions useful in the present invention is their lower viscosity at laminating temperatures which facilitates the lamination procedure.

In order to further describe the present invention, reference is made to the accompanying drawing which represents a cross-sectional diagrammatic view of a corrugated board prepared in accordance with the present invention. In reference to the drawing, two flat lining sheets 10, usually paper, are placed one on either side of a corrugated laminate sheet 11 which consists essentially of two corrugated sheets 12 bonded together by means of an asphaltic lamina 13. Lining sheets 10 are united to the corrugated sheet by means of an adhesive 14 at the crest 15 of the corrugations.

To demonstrate the present invention as well as to further describe its practice, the following examples are presented. These examples are in no manner to be construed as limiting the present invention.

EXAMPLE I

A corrugated paper board is prepared by laminating two sheets of paper with an asphaltic composition having the following properties:

Softening point, ° F. (R&B) _____ 215
Penetration:
    At 77° F., 100 grams, 5 sec. _____ 35
    At 32° F., 200 grams, 60 sec. _____ 23
    At 115° F., 50 grams, 5 sec. _____ 58
Viscosity, S. Furol at 375° F., sec. _____ 150

This asphaltic composition was prepared by non-catalytically air-blowing at 500° F. for 1.32 hours a mixture consisting of 90% by weight of an asphalt flux of 84 seconds float at 122° F. and 10% by weight of a slack wax containing about 16% by weight of oil and having a melting point of about 145° F.

The asphaltic laminant was applied at a temperature of 355° F. in an amount of 45 lbs. of asphalt per 1000 square feet of surface of one of the sheets of paper. The resulting laminated sheet was then corrugated and the resulting corrugated laminate united with two flat sheets of linerboard, one on either side to form a corrugated paperboard. To unite these two sheets of linerboard with the corrugated sheet, a starch adhesive was applied to the crests of the corrugated sheet and the two flat linerboard sheets placed in contact therewith.

To demonstrate the advantages resulting from the compositions of the present invention, a number of laminated sheets were prepared using the asphaltic compositions and asphalts as the laminating medium. It has been found that the flaking and strength properties of the laminated sheets are directly related to the same properties of the corrugated boards containing the laminated sheets. The laminated sheets were compared as to strength and/or as to the degree of flaking resulting from puncture of the laminated sheet. The following table presents the composition and properties of the asphaltic compositions and asphalts used as laminating media.

| No. | Composition | Softening point, ° F. | Viscosity, S.F. at 375° F., sec. | Penetration at 77° F. | Penetration at 32° F. | Penetration at 115° F. |
| --- | --- | --- | --- | --- | --- | --- |
| 1 | Mixture of 90% by wt. asphalt flux of 84 sec. float at 122° F. and 10% by wt. of slack wax containing 16% by wt. oil and melting at about 145° F. which mixture was air-blown at 500° F. for 1.25 hours. | 207 | 90 | 37.5 | 24 | 63 |
| 2 | Same composition as No. 1 but air-blown for 1.39 hrs. | 227 | 201 | 32 | 21 | 52 |
| 3 | 100% asphalt flux of 183 sec. float at 122° F. air-blown to 195° F. softening point. | 195 | 132 | 32 | 21 | 51 |
| 4 | Mixture of 90% by wt. of a 174 penetration (at 77° F.) propane extracted asphalt which had been air-blown to 225° F. softening point and 11 penetration (at 77° F.) and 10% by wt. of a micro crystalline wax of about 170° F. melting point. | 212 | 254 | 16 | 8 | 31 |
| 5 | Same as No. 4 except mixture contained 80% by wt. asphalt and 20% by wt. wax. | 220 | | 21 | 10 | 41 |
| 6 | 100% asphalt | 190 | ca. 150 | 15 | 7 | 34 |
| 7 | Mixture of 97% by wt. of 150/200 penetration (at 77° F.) asphalt air-blown with 0.8% by wt. P₂O₅ catalyst to 175/180° F. softening point and 35/40 penetration (at 77° F.), 2% by wt. of a neutral lubricating oil of about 200 S.U.S. viscosity at 100° F. and 1% by wt. of a styrene-butadiene copolymer in which the bound styrene is about 25-30% and the solids content about 65%. | 188 | 168 | 43 | 24 | 79 |

The laminated sheets were prepared by melting and heating the asphalt or asphaltic composition until a viscosity of about 500 centipoise was reached which was usually at temperatures of from 300 to 350° F. About 100 grams of the asphalt or asphaltic composition was then poured onto a 12" x 36" sheet of kraft paper and spread evenly across the paper with a trowel. After cooling, the asphalt or asphaltic composition-containing paper was cut into pieces of about 4½" x 5½". Eighteen mil shims were used in a Carver press to laminate pieces of kraft paper to the asphalt or asphaltic composition-containing sheets. The platens were heated to 40 to 90° C., depending on the melting point and viscosity of the laminating material, and about 2000 p.s.i.g. used for the hydraulic pressure.

The laminated sheets were tested for flaking as follows: The laminated sheets were placed in a cold box at 30° F. for one hour, then removed from the cold box and clamped in a metal frame having a 3" x 4" opening. The sheets were then immediately cut diagonally across the sheet with a rough steel edge. Flakes of asphalt resulting from this puncturing and cutting of the laminated sheet were caught on a piece of white typing paper below the frame. Composition No. 6 described above produced the worst flaking and was used as a standard in rating the other compositions. The amount of flaking of Composition No. 6 was assigned the amount of 100% flaking and the others rated with respect thereto in the amount of flakes produced. The following table gives the percent flaking for each of the laminated sheets prepared from the above-described asphalt or asphaltic compositions.

| Composition No.: | Percent flaking |
| --- | --- |
| 1 | 1.5 |
| 2 | 6.0 |
| 3 | 30.0 |
| 4 | 100.0 |
| 5 | 60.0 |
| 6 (Standard) | 100.0 |
| 7 | 15.0 |

On consideration of the above table, it is apparent that a substantial improvement in flaking or friability results from the asphaltic compositions of the present invention which are represented by Compositions No. 1 and 2 above.

To further demonstrate the advantages of the compositions of the present invention, certain laminated sheets prepared in the above-described manner, except as to thickness of the laminated sheets, were tested for dry strength as follows: Test strips of the laminated sheets were cut one inch wide and four inches long and placed flat on two horizontally placed ⅜" diameter pins which were two inches apart. A third ⅜" diameter pin was placed on the upper surface of the test strip equidistant between the two supporting pins. This third pin was then pulled downward at a controlled rate of speed and the force necessary to maintain the downward descent of the third pin measured. This force was recorded as strain on the test strip and a peak train was obtained for each strip just before the laminated sheet began to buckle. The greater the peak strain recorded, the greater the strength of the laminated sheet. The results of these tests are shown in the following table.

| Composition | Thickness, mils | Peak strain, lbs. |
| --- | --- | --- |
| No. 1 | 18 | 0.30 |
|  | 20 | 0.38 |
|  | 22 | 0.61 |
| No. 2 | 18 | 0.46 |
|  | 20 | 0.55 |
|  | 22 | 0.61 |
| No. 3 | 19 | 0.25 |
|  | 20 | 0.26 |
| No. 6 | 17 | 0.24 |
|  | 21 | 0.34 |
| No. 7 | 21 | 0.20 |
|  | 22 | 0.25 |

From the above table, it is apparent that Compositions No. 1 and No. 2 have strength superior to the other compositions tested. Composition No. 7 which had flaking properties nearest those of compositions No. 1 and No. 2 had substantially lower strength than did No. 1 and No. 2.

The asphaltic compositions of the present invention are comprised of 80 to 97% by weight of asphalt and 3 to 20% by weight of a petroleum derived wax. These asphaltic compositions should have a softening point within the range of 170 to 230° F. (ASTM-36), a penetration at 32° F., 200 grams, 60 seconds within the range of 15 to 30 mm./10, a penetration at 77° F., 100 grams, 5 seconds within the range of 25 to 45 mm./10, a penetration at 115° F., 50 grams, 5 seconds within the range of 40 to 70 mm./10 (ASTM D-5) and a Saybolt Furol viscosity at 375° F. of 25 to 250 seconds. The particular asphalt used in the asphaltic composition of the present invention will vary depending upon the particular wax used. A particularly useful group of asphalts for use in the asphaltic compositions of the present invention are those having softening points within the range of 165 to 240° F. and having penetrations at 77° F. of 10 to 50 mm./10 and obtained by catalytically or non-catalytically air-blowing an asphalt flux of about 50 to 300 seconds float at 122° F. Such asphalt fluxes may be obtained from commonly used refining or treating processes such as distillation, steam and/or vacuum reduction, solvent treating, etc. The sources of these asphalt fluxes include California crudes, mid-continent crudes, South Arkansas crudes, East Texas crudes as well as most foreign crudes. A particularly useful source of the asphalt constituent of the asphaltic compositions of the present invention are the South Arkansas crudes. Within the above-described particularly useful group of asphalts, those having a softening point of 190 to 230° F., a penetration at 77° F. of 20 to 40 mm./10 and obtained by non-catalytically air-blowing an asphalt flux of 70 to 120 seconds flat at 122° F. are preferred. The air-blowing step used in preparing these particularly useful asphalts is carried out by conventional methods whether catalytically or non-catalytically. If carried out catalytically, it is preferred that a $P_2O_5$ air-blowing catalyst be used.

The waxes useful in the asphaltic compositions of the present invention are most often petroleum-derived. Generally, suitable waxes will have a melting point within the range of 120 to 180° F. (ASTM D-127-63). Such waxes are paraffinic in nature, usually contining at least 60 to 75% by weight of paraffin wax constituents. A particularly useful group of petroleum-derived waxes are those having a melting point within the range of 130 to 175° F. and being relatively free of oil constituents. Such waxes, preferably, are present in the asphaltic composition in the amount of 3 to 15% by weight of the asphaltic composition. Another group of petroleum waxes which are very useful in preparing the asphaltic compositions of the present invention are the so-called "slack" waxes. Such waxes usually have melting points within the range of 120 to 160° F. and contain from 10 to 30% by weight of oily constituents. Preferred slack waxes for the purposes of the present invention are those having a melting point within the range of 140 to 160° F. and contain a maximum of about 15 to 25% by weight of oily materials. When the slack waxes are employed in preparing the asphaltic compositions of the present invention, they are usually admixed with one of the above-described non-air-blown asphalts and then the mixture air-blown either catalytically or non-catalytically, preferably non-catalytically, to the above-defined properties for the asphaltic composition. The amount of slack wax mixed with the asphalt will generally be greater than the amount of pure wax, preferably being such as to be 5 to 30% by weight of the asphalt-slack wax mixture. Air-blowing of the mixture of slack wax and asphalt is usually carried out by conventional air-blowing techniques useful for air-blowing asphalts. Preferably, however, this air-blowing is carried out at a temperature of 450 to 550° F.

Preparation of the asphaltic compositions of the present invention most often comprises heating the asphalt until it is sufficiently fluid for agitation and then adding the wax either melted or in solid form and continuing agitation until the asphalt and wax are thoroughly mixed. Also, the asphalt and wax may be admixed as solid pellets or flakes and the mixture heated until fluid and then stirred to affect a thorough mixture of asphalt and wax. As above described, when the wax used is a slack wax, it is usually desirable, and in fact generally necessary, to air-blow the asphalt-wax mixture to obtain the above-defined properties for the asphaltic composition.

The asphaltic compositions of the present invention are very useful in the preparation of corrugated board constructions. However, these asphaltic compositions are also very useful as laminating compositions in preparing flat, non-corrugated board constructions where good strength and low friability are necessary properties. In addition, these asphaltic compositions are useful as coating compositions and also as molding compositions.

In preparing the corrugated paperboard constructions of the present invention, the amount of the asphaltic composition used will vary to some extent depending upon the proposed use of the paperboard and with the materials used for forming the corrugated sheets and outer lining sheets. Usually, however, the amount of the asphaltic composition used will be within the range of 0.005 to 0.06 lb. of asphalitc composition per square foot of surface of the sheet to which it is applied as hereinafter described. Generally, as strength requirement increase, the amount of asphaltic composition used will also increase, however, seldom if ever will it exceed the above-defined limits.

Constructions according to the present invention may contain as outer lining sheets and corrugated sheets any of the materials conventionally used for such purpose. Included within this category are outer lining sheets and corrugated sheets of paper, paperboards, fabrics, cardboards, plastics, and the like. The most useful corrugated board constructions of the present invention are those containing paper, paperboard or cardboard as the outer lining sheets and the corrugated sheets.

The corrugations of the laminated corrugated sheets of the present constructions may be varied widely depending upon the utility to which the corrugated board compositions are to be put. Usually, however, conventional designs are used varying from 36 to 50 flutes per lineal foot, the flutes being from $\frac{1}{10}$ to $\frac{3}{16}$ inch high. The number and height of the flutes of the corrugated medium of the present composition, while important for a particular use, are not critical to the present invention since the improvements obtained by the present compositions are based upon improvements over corrugated boards of substantially the same general construction with the exception of the construction of the particular laminated corrugated sheets of the present invention.

The number of sheets or laminae in the corrugated laminated sheets of the present construction is at least 2. However, more than two sheets may be laminated to form the corrugated sheet. Preferably, however, 2 sheets are used.

The adhesives useful for adhering the outer lining sheet or sheets include all of those conventionally used as well as other materials suitable for such purpose. Such adhesives include, but are not limited to starch, casein, rubber latex, phenolic resins, polyester resins, and the like.

In addition to the above-described components of the corrugated board constructions disclosed and described herein, it is often desired to add waterproofing agent to one or both of the outer lining sheets. Such waterproofing agents may be any of those known to the art for such utility. These include, various petroleum derived impregnants such as asphalts, petroleum waxes, etc., various natural waxes, polymeric films such as polyvinyl chloride, polyvinyl acetate, polyvinyl chloride-polyvinyl acetate copolymers, polyethylene, etc. and blends of the above, both with one another and with other suitable materials.

Often the choice of waterproofing agents depends almost entirely on the subsequent use of the corrugated board. Waterproofing agents such as petroleum derived asphalts cause the impregnated surface to be black which for many utilities is undesirable.

The corrugated board compositions of the present invention find particular use in the preparation of containers such as boxes or parts of boxes which must withstand rough handling without breaking down and without fragmenting of the asphaltic lamina. For example, the corrugated board constructions of the present invention are particularly useful for the preparation of boxes and box lids for shipping meats or other foods which boxes are likely to be stacked in high stacks or which are stored and handled under conditions which will likely result in puncturing or cutting of the boxes or box lids.

The method whereby the laminated corrugated sheet of the present corrugated board constructions is laminated most often comprises coating a sheet of material suitable for corrugating with the asphaltic bonding agent disclosed and described herein, adhering a second sheet of such material to the surface of the asphaltic composition opposite the first sheet and thereafter corrugating the resulting laminate. The asphaltic composition is usually applied to the first sheet of material suitable for corrugating at an elevated temperature sufficiently high to reduce the viscosity of the asphaltic composition enough to allow it to be readily coated onto the surface of the sheet and to adhere to the sheet. Application of the asphaltic composition to the surface of the first sheet may be by any conventional method including, but not limited to brushing, rolling, spreading, spraying, and the like. In order to facilitate coating the surface of the first sheet with the asphaltic composition, particularly by such methods as spraying, it may be desirable to mix a viscosity reducing agent such as a light naphtha, heptane, hexane, or the like, with the asphaltic composition. However, the addition of a viscosity reducing agent is seldom practical because of the difficulties arising out of removing the agent from the asphaltic composition and the lack of desirability of having such in the resulting laminated corrugating sheet. The second sheet of paper suitable for corrugating is joined with the surface of the asphaltic composition opposite the first sheet of paper, generally while the asphaltic composition is still at elevated temperatures. Usually to insure lamination of the two sheets by the asphaltic composition, pressure is applied to one or both surfaces of the laminate while the asphaltic composition is still at a slightly elevated temperature. This is usually done by passing the laminated sheet between two rollers. The resulting laminated sheet is then corrugated by any conventional means. The only restriction on corrugation is that the laminated sheet be corrugated with the asphaltic composition in the laminated sheet sufficiently soft to be flexible enough to allow corrugating without cracking or breaking of the asphaltic composition.

What is claimed is:

1. A corrugated board construction comprised of a corrugated sheet having attached to the crests of the corrugation thereof at least one substantially flat lining sheet, said corrugated sheet comprising a laminate of at least two corrugated sheets laminated together with an asphaltic composition, said asphaltic composition comprised of 80 to 97% by weight of an asphalt and 3% to 20% by weight of a petroleum-derived wax and having a softening point of 170 to 230 F., a penetration at 32° F., 200 grams, 60 sec. of 15 to 30 mm./10, a penetration at 77° F., 100 grams, 5 sec. of 25 to 45 mm./10, a penetration at 115° F., 50 grams, 5 sec. of 40 to 70 mm./10, a viscosity (Saybolt Furol) at 375° F. of 25 to 250 sec.

2. The construction of claim 1 wherein said corrugated sheet has attached to the corrugations thereof, two substantially flat outer lining sheets, one on each side of said corrugated sheet.

3. The construction of claim 1 wherein said corrugated sheets and said substantially flat outer lining sheet are a material selected from the group consisting of paper, paperboard and cardboard.

References Cited

UNITED STATES PATENTS

| | | | |
|---|---|---|---|
| 1,684,873 | 9/1928 | Lord | 106—273 |
| 2,071,360 | 2/1937 | Reid | 161—135 |
| 2,464,759 | 3/1949 | Camp | 106—270 |
| 3,032,928 | 5/1962 | Jackson | 106—270 |

MORRIS SUSSMAN, Primary Examiner

U.S. Cl. X.R.

106—232, 270, 273; 161—235, 238; 156—210